July 17, 1962 R. L. ATKINSON 3,044,279
BEARING ASSEMBLIES AND MACHINERY GUARDS INCORPORATING THEM
Filed Nov. 12, 1959 3 Sheets-Sheet 1

Inventor:
RICHARD LESLIE ATKINSON

By
Richardson, David and Nordon
Attorneys

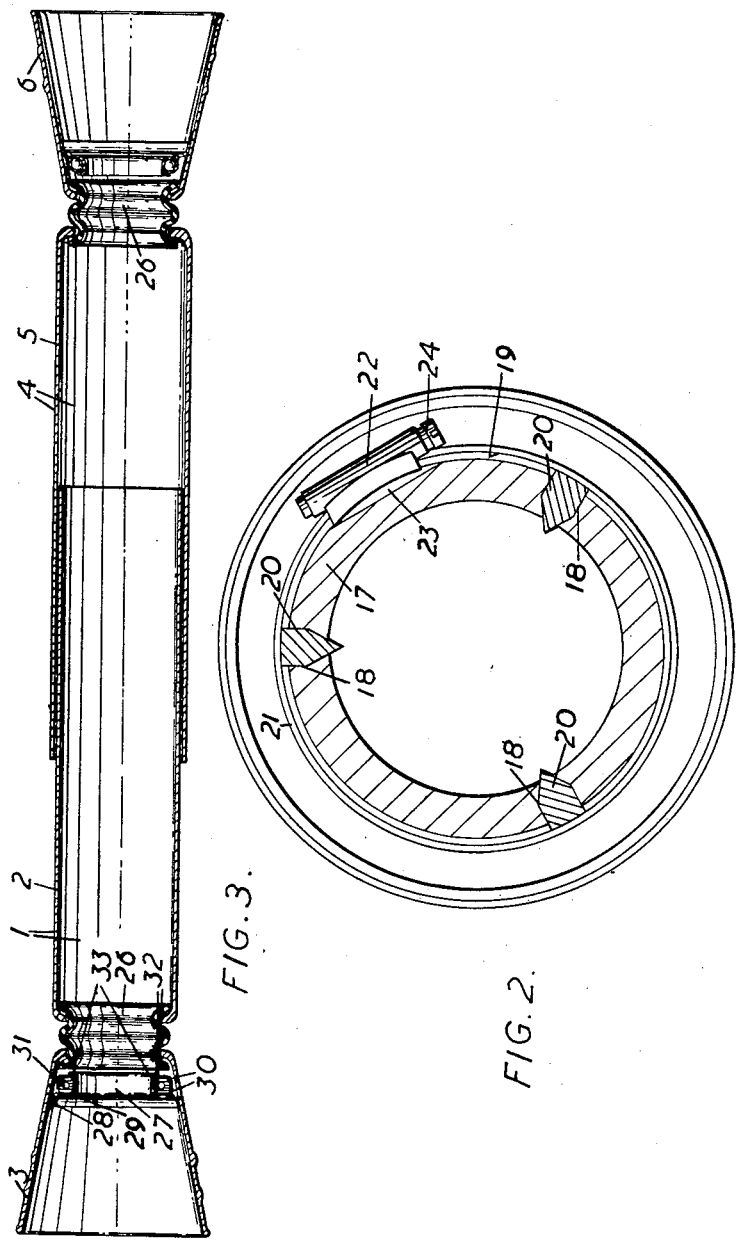

United States Patent Office 3,044,279
Patented July 17, 1962

3,044,279
BEARING ASSEMBLIES AND MACHINERY GUARDS INCORPORATING THEM
Richard Leslie Atkinson, Bolton-by-Bowland, near Clitheroe, England, assignor to Atkinson's Agricultural Appliances Limited, Clitheroe, England, a company of Great Britain
Filed Nov. 12, 1959, Ser. No. 852,457
Claims priority, application Great Britain Dec. 8, 1958
6 Claims. (Cl. 64—4)

This invention relates to bearing assemblies; it also relates to machinery guards incorporating such bearing assemblies and more particularly to safety guards of the kind comprising a tubular sheath floatingly encompassing and supported by a rotatable shaft. The invention is especially intended for use with shaft couplings comprising a telescopic shaft provided at each of its ends with a universal joint for connection to driving and driven machinery respectively.

From one aspect, the invention is (A) a bearing assembly comprising a bearing having an outer annular member and an inner annular member rotatable about and co-axial with said outer annular member, at least one of said members having a clamp co-axially attached to it, suitable for clamping it to an article to be associated with the bearing assembly. The annular members may constitute the outer and inner races of a ball bearing which may be either a journal or a thrust type of bearing. In order to avoid the need for lubrication, certain of the bearing components may be made of a thermo-setting resin, or a long-chain synthetic polymeric amide and of a construction, all as hereinafter described in detail.

From other aspects, the invention is (B) a shaft envelope comprising a tubular sheath, said sheath having internally attached thereto the outer annular member of a bearing assembly as hereinbefore defined; (C) a shaft envelope assembly comprising a plurality of shaft envelops as hereinbefore defined having their sheaths telescopically slidable with respect to each other; (D) a shaft or shaft coupling as hereinbefore defined, in combination with any of the aforementioned aspects of the invention; and (E) a ball bearing as hereinafter described in detail suitable for use in a bearing assembly as hereinbefore defined. By the term "ball bearing" as used herein and in the appended claims is to be understood any bearing having an outer race, an inner race and one or more antifriction components between them, such as balls or rings as hereinafter exemplified and also includes rollers.

For certain out-door applications, notably argicultural machinery, such as the power take-off shaft on tractors, it has been found that sheaths made of polyvinyl chloride or polythene are particularly desirable because of their resistance to deterioration due to exposure to stringent atmospheric conditions.

Bearing assemblies, shaft envelopes and shaft envelope assemblies according to the invention are suitable for fitting to shafts which have not got specially machined surfaces for the fitting of the inner race of ordinary ball bearings; the invention is therefore particularly suitable for providing shafts of existing machinery with safety guards.

Two preferred embodiments of the invention will now be described with reference to the accompanying drawings in which:

FIG. 2 is an enlarged section on AA in FIG. 1;

FIG. 3 is an axial section through an alternative construction of a shaft envelope assembly, also showing an alternative construction of a thrust bearing; in FIG. 3 the clamps are omitted.

Figure 1:
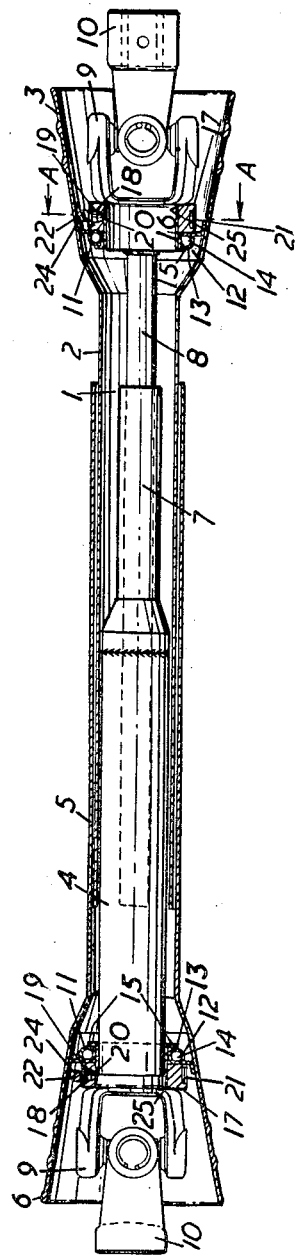
FIG. 1 is an axial section through a telescopic shaft coupling embodying the invention.

Referring to FIG. 1, 1 is a polythene tube of circular cross-section and bore, having a portion of uniform cross-section 2 and a flared frusto-conoidal end portion 3. 4 is a second tube, identical in all respects with tube 1, except that its portion of uniform cross-section 5 is of larger bore than that of portion 2 of tube 1, its bore being such that portion 2 forms a freely sliding fit therein. It has a frusto-conoidal end portion 6.

The shaft envelope assembly formed by the telescoped tubes 1 and 2 surrounds a shaft coupling consisting of a telescopic shaft having shaft members 7 and 8, each shaft member terminating in a universal joint 9. A stub-shaft 10 is connected to the free end of each universal joint 9.

Figure 4:
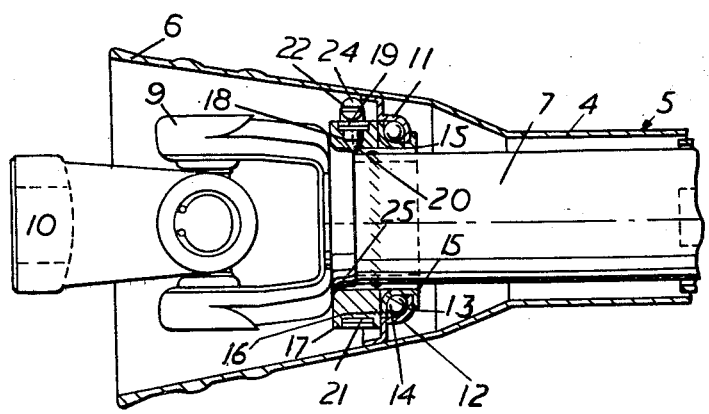
FIGS. 4, 5 and 6 are axial sections illustrating on a larger scale the bearings shown, respectively, in FIG. 1, at the left-hand side in FIG. 3, and at the right-hand side in FIG. 3.

As shown to a larger scale in FIG. 4, 11 are thrust bearings, each having a steel outer ring 12, a steel inner ring 13 and a number of balls 14 retained between said rings. The balls are either of a phenol-formaldehyde resin, known generally as "Bakelite" (registered trade mark) or of nylon. Alternatively the balls 14 may be replaced by a nylon ring of circular cross-section. The inner ring 13 has four circumferentially spaced pads 15 which, before assembly of the bearing, extend axially and which, upon assembly, are peened over the edge of the outer ring 12 as shown, to locate the inner ring relative to the outer ring.

The outer ring 12 of the bearing is riveted to the inside wall of portion 3, and that of the other bearing to the inside wall of portion 6.

Referring particularly to FIGS. 2 and 4, the inner ring 13 of each bearing has welded to it along its annular face 16 a steel annular member 17, having three equally spaced radial holes 18 and a circumferential groove 19 linking said radial holes.

Alternatively, the member 17 may be made of rubber and bonded to the inner ring 13. Each hole is tapered at its inner end and permits a cylindrical hardened steel peg 20, pointed at one end, inserted in each hole 18, to penetrate the member 17 inwardly, to a limited extent. An adjustable circumferential steel collar 21 having a screw adjusting mechanism 22 is accommodated in the groove 19, the screw adjusting mechanism 22 being accommodated on a flattened cut-away portion 23 on the outer curved surface of the member 17, whereby the collar 21 is prevented from turning relative to the member 17. The portions 3 and 6 each have a hole, closable by a rubber grommet or plug (not shown) opposite the head of the screw 24, to permit insertion of a screw driver for the purpose of adjusting the collar 21.

To fit a shaft envelope assembly according to the invention over a telescopic shaft coupling between a tractor and an implement, the tractor and the implement are connected and the telescopic shaft is fitted to the implement. The male section 8 of the shaft is withdrawn and the shaft envelope assembly is fitted over the female section 7 of the shaft. The male section 8 of the shaft is reconnected and the shaft is coupled to the tractor power-take-off The end portions 3 and 6 are pulled apart until the annular members 17 abut the shoulders 25 of the universal joints 9. The screws 24 are then turned until the points on the pegs 20 bed into the surfaces of the shaft members 7 and 8 whereby the inner ring 13 of each thrust bearing 11 is securely attached to its respective shaft member. Finally the holes in the end portions 3 and 6 are plugged up by the rubber grommets or plugs.

Figure 5:
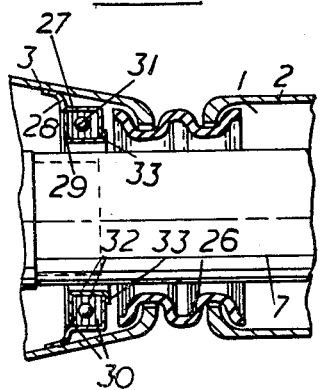
Figure 6:
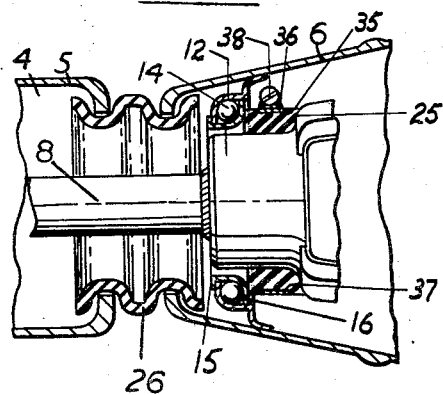

Referring to FIGS. 3, 5 and 6 the tubes 1 and 4 each have a convolute rubber hose 26 connecting their portions of uniform cross-section 2 and 5 to their flared frustro-conoidal end portions 3 and 6 respectively, whereby additional relative axial movement between the end portions 3 and 6 is made possible.

The thrust bearing 27, shown fitted to tube 1, in FIGS. 3 and 5, has a steel outer ring 28, a steel inner ring 29, two annular nylon washers 30 and a number of nylon balls 31 contained in a nylon cage 32. The inner ring 29 has four circumferentially spaced pads 33 which, before assembly of the bearing, extend axially and which, upon assembly, are peened over the edge of the outer ring 28 as shown, to locate the inner ring relative to the outer ring. The bearing 27 is secured to the shaft member 7 by means (not illustrated) which correspond to the means securing the bearings 11 to the shaft members 7 and 8 in the embodiment of the invention illustrated in and hereinbefore described with reference to FIGS. 1, 2 and 4.

The thrust bearing shown fitted to tube 4, in FIGS. 3 and 6, includes a rubber annular member 35 bonded to the annular face 16 of the inner ring 13, and an adjustable steel collar 36 located in a circumferential groove 37 in the outer peripheral surface of the rubber member 35, the collar 36 being contracted by tightening of the screw 38 whereby the rubber member 35 is securely fastened in position around the hub 39 of the yoke 40 of the universal joint and the inner ring 13 of the thrust bearing is securely attached to the yoke 40, i.e. relative to the shaft member 8.

In all other respects the shaft envelope assemblies shown in FIGS. 1 and 3 are identical and like reference numerals refer to like parts in all of the figures. It should also be understood that in actual practice the bearings used in both tubes would normally be identical and that the different bearings shown in the end portions 3 and 6 in FIG. 3 are for purposes of illustration only.

I claim:

1. For use with use with shaft couplings comprising a telescopic shaft provided at each of its ends with a universal joint for connection to driving and driven machinery respectively, a machinery guard comprising two straight tubes telescoping one with the other and each of uniform internal diameter greater than the maximum diameter of the telescopic shaft, a flared frustro-conical end portion at the outer end of each of said tubes, each said end portion being adapted to fit with clearance over one said universal joint, and two bearing assemblies mounted one internally of each said end portion, each said bearing assembly comprising an inner ring which is a sliding fit about the telescopic shaft adjacent one said universal joint, an outer ring co-axial with said inner ring, means securing said outer ring internally of the said end portion in the vicinity of the smaller end of the latter, anti-friction means disposed between said rings and enabling relative rotation therebetween, an annular member co-axial with said rings and located in axial continuity therewith, means rendering said annular member and said inner race integral with one another, said annular member being inwardly movable at least at circumferentially spaced portions thereof thus effectively to constrict same in diameter, said annular member having a circumferential groove, a circumferentially adjustable collar seated in said groove and adapted on circumferential adjustment to affect the effective diameter of said annular member, and means for reducing the circumferential length of said collar thus effectively to constrict the diameter of said annular member for the purpose of clamping same to said telescopic shaft when the machinery guard is mounted about the shaft coupling.

2. A machinery guard as claimed in claim 1, having an axially resilient tubular portion between the outer end of each tube and the flared end portion at said end.

3. A machinery guard as claimed in claim 2, wherein said axially resilient tubular portion is accordion-creased.

4. A machinery guard as claimed in claim 3, wherein each tube is made of a thermo-plastic material.

5. A machinery guard as claimed in claim 4, wherein the thermo-plastic material is polythene.

6. A machinery guard as claimed in claim 5, wherein the end portions are made of polythene.

References Cited in the file of this patent
UNITED STATES PATENTS

| | | |
|---|---|---|
| 1,643,156 | Farmer | Sept. 20, 1927 |
| 2,166,391 | Borland | July 18, 1939 |
| 2,308,073 | Hagerty | Jan. 12, 1943 |
| 2,665,930 | Stanley | Jan. 12, 1954 |
| 2,779,643 | Firth | Jan. 29, 1957 |
| 2,785,549 | Harrington | Mar. 19, 1957 |
| 2,911,803 | Weasler | Nov. 10, 1959 |
| 2,952,142 | Schroter et al. | Sept. 13, 1960 |
| 2,970,018 | Ruttgers | Jan. 31, 1961 |

OTHER REFERENCES

Nylon Parts for Ball Bearings, by Reckaagel in "Product Engineering," February 1952, pages 119–123. (Copy in Div. 45 308–N.)